United States Patent [19]

Vasiliev et al.

[11] 4,059,788
[45] Nov. 22, 1977

[54] DEVICE FOR AUTOMATICALLY CONTROLLING AN ELECTROEROSION CUTTING MACHINE

[76] Inventors: Vladimir Sergeevich Vasiliev, Novye Cheremushki, kvartal 26/6, korpus 28, kv. 67; Abram Lazarevich Livshits, Profsojuznaya ulitsa, 62, korpus 2, kv. 69; Vadim Evgenievich Polotsky, Leninsky prospekt, 70/11, kv. 238; Yakov Iosifovich Zlatkin, Shosseinaya ulitsa, 42, kv. 311, all of Moscow, U.S.S.R.

[21] Appl. No.: 654,284

[22] Filed: Feb. 2, 1976

[51] Int. Cl.² ............................................. G05B 19/36
[52] U.S. Cl. ............................. 318/577; 219/125 PL
[58] Field of Search ........... 318/577; 219/68, 125 PL; 250/202

[56] References Cited

U.S. PATENT DOCUMENTS

| | | | |
|---|---|---|---|
| 3,686,504 | 8/1972 | Vainer | 318/577 X |
| 3,775,581 | 11/1973 | Sciaky | 219/125 PL |
| 3,920,316 | 11/1975 | Daquillon | 250/202 |
| 3,932,743 | 1/1976 | Sitnichenko et al. | 318/577 X |

*Primary Examiner*—Robert K. Schaefer
*Assistant Examiner*—John J. Feldhaus
*Attorney, Agent, or Firm*—Haseltine, Lake & Waters

[57] ABSTRACT

A device for automatically controlling an electroerosion cutting machine in which a unit for selecting a direction of rotation of drive motors in the course of erosion working, includes a coincidence circuit and a reversible ring shift register whose outputs are connected to inputs of the coincidence circuit, whereas the latter's outputs are electrically coupled to coordinate drive motors which move an electroerosion tool relative to the workpiece, and an optical head relative to a coordinate follow table. The optical head is electrically connected to the register and coincidence circuit via a first amplifier having four divided outputs, two of which are connected to respective inputs of the ring shift register, whereas the remaining two are connected to the inputs of the coincidence circuit.

2 Claims, 4 Drawing Figures

DEVICE FOR AUTOMATICALLY CONTROLLING AN ELECTROEROSION CUTTING MACHINE

BACKGROUND OF THE INVENTION

The present invention relates to devices for controlling electroerosion working of metals and, in particular, to a device for automatically controlling an electroerosion cutting machine used for working articles with reference to a preselected magnified drawing.

A device is known for automatically controlling an electroerosion cutting machine. It contains a coordinate follow table with a drawing placed thereon, and an optical reading head which moves along the line of the drawing by coordinate drive motors which also move an electroerosion tool relative to the workpiece.

The known device contains a first amplifier whose input is connected to the output of the optical head. The input of a second amplifier is electrically coupled to the erosion gap. The device also includes a unit for selecting the direction of rotation of the drive motors in the course of erosion working. The inputs of this unit are connected to the outputs of a unit for setting the initial conditions of the electroerosion working, as well as to the outputs of the first and second amplifiers. The outputs of the unit for selecting the direction of rotation of the drive motors are electrically connected via a third amplifier and a fourth amplifier to the drive motors which ensure coordinate-wise movement of the optical head and the respective movement of the electroerosion tool.

In this device, the optical head is rotatable. It is provided with an auxiliary drive motor that enables the head to locate a required line in the drawing. As soon as the line is found, the optical head is moved along this line with the aid of the driving motors of the coordinate follow table.

If the line is outside the zone of action of the optical head, the drive motor of the head is again brought into action and turns the head until the line is found.

The direction of further movement of the head along the line in the drawing is determined by the rotation angle of the head. The device operates the drive motors of the coordinate table in reference to this angle.

Preliminary rotation of the head and its subsequent movement in the two coordinates along the line in the drawing account for a low response speed of the device and insufficient accuracy with which the line is followed at steep bends and at high speeds.

Apart from the foregoing considerations, the necessity of a preliminary rotation of the head accounts for its sophisticated design.

The movement of the optical head along the line in the drawing relative to the coordinate table must be synchronized with the movement of the electroerosion tool relative to the workpiece. In the known device, this is attained through a rigid mechanical coupling between the head and the tool via a mechanical reduction gear.

The auxiliary mechanical means for synchronizing the movment of the head and tool do not make it possible to use the known device in combination with a variety of electroerosion cutting machines.

It is rather difficult to use the known device in combination with some of the existing types of machines. It requires additional modifications in the machine's design. It is altogether impossible to use this device with some other types of machines.

In view of the above, it is an object of the present invention to provide a device for automatically controlling an electroerosion cutting machine, having a sufficient operation speed in following lines of a drawing at sharp bends and at high speeds when moving around such bends.

It is another object of the present invention to provide a universal design of an automatic control device which could be used in combination with any type of electroerosion cutting machine.

Another object of the present invention is to provide an automatic control device employing an optical head of a simple design.

SUMMARY OF THE INVENTION

The foregoing and other objects of the present invention are attained by providing a device for automatically controlling an electroerosion cutting machine. This device contains a coordinate follow table with a drawing placed thereon, and an optical reading head which moves along a line in the drawing and is driven by coordinate drive motors that also move an electroerosion tool relative to the workpiece. The input of a first amplifier of the device is connected to the output of the optical head. The input of a second amplifier is electrically connected to the erosion gap. The outputs of a unit for setting initial conditions of electroerosion working, as well as the outputs of the first and second amplifiers are connected to the inputs of a unit for selecting a direction of rotation of the drive motors in the course of electroerosion working. The outputs of the unit for selecting the direction of rotation of the drive motors are electrically connected via a third amplifier and a fourth amplifier to the drive motors which move the optical head coordinate-wise and, accordingly, an electroerosion tool. According to the invention, the first amplifier has four divided outputs. The unit for selecting a direction of rotation of the drive motors in the course of electroerosion working contains a reversible ring shift register to whose inputs there are connected outputs of the unit for setting initial conditions of electroerosion working. The outputs of this unit are intended for a signal of initial rotation directions, the output of the initial conditions setting unit which is used for a signal of the shift speed of the reversible ring shift register, and the two first outputs of the first amplifier, which is used for signals of reversal of the shift direction of reversible ring shift register. The unit for selecting a direction of rotation of the drive motors further has a coincidence circuit to whose inputs there are connected the third and fourth outputs of the first amplifier, the outputs of the reversible ring shift register, the output of the second amplifier, and the outputs of the initial conditions setting unit which is used for a signal of predetermined rotation speeds of the drive motors. The outputs of the coincidence icrcuit are connected via the third and fourth amplifiers to the drive motors. The output of the third amplifier is connected to the drive motors which move the optical head along the first coordinate relative to the coordinate table and the electroerosion tool relative to the workpiece. The output of the fourth amplifier is connected to the drive motors which move the head and the tool in the second coordinate.

It is expedient that the coincidence circuit should be constructed of six groups of AND circuits, each consisting of four AND circuits and six OR circuits. The first output of the second amplifier should be connected to the first inputs of the AND circuits of the first group; the second output of the second amplifier should be connected to the first inputs of the AND circuits of the second group. The third output of the first amplifier must be connected to the first inputs of the AND circuits of the third group; the fourth output of this amplifier must be connected to the first inputs of the AND circuits of the fourth group. The first inputs of the AND circuits of the fifth and sixth groups are to be connected to the two outputs of the unit for setting the rotation speed of the drive motors. The second inputs of the first, second, third and fourth AND circuits of all the groups are to be connected, respectively, to the first, second, third and fourth outputs of the reversible ring shift register. The outputs of the first, third, fourth and second AND circuits of the first, second, third and fourth groups, respectively, are to be connected to the input of the first OR circuit whose output is connected to the first direction input of the third amplifier. The outputs of the second, fourth, first and third AND circuits, respectively, of the first, second, third and fourth groups are connected to the inputs of the second OR circuit whose output is connected to the first direction input of the fourth amplifier. The outputs of the third, first, fourth and second AND circuits, respectively, of the first, third, fourth and second groups are connected to the inputs of the third OR circuit whose output is connected to the second direction input of the third amplifier. The outputs of the fourth, second, third and first AND circuits, respectively, of the first, second, third and fourth groups are connected to the inputs of the fourth OR circuit whose output is connected to the second direction input of the fourth amplifier. The outputs of the first and third AND circuits of the fifth group and second and fourth AND circuits of the sixth group are connected to the inputs of the fifth OR circuit. The outputs of the second and fourth AND circuits of the fifth group and first and third AND circuits of the sixth group are connected to the inputs of the sixth OR circuit, The outputs of the fifth and sixth OR circuits are connected to the third inputs, respectively, of the third and fourth amplifiers.

The circuitry of the proposed device and, in particular, of the unit for selecting a direction of rotation of the drive motors in the course of electroerosion working ensure a required accuracy and operation speed in following lines of any curvature. The device dispenses with auxiliary mechanical means for synchronizing the movement of the head and tool and employs an optical head of a simple design.

All these factors make it possible to employ the proposed device in combination with any type of electroerosion machine with step drive motors.

BRIEF DESCRIPTION OF THE DRAWINGS

Other objects and advantages of the present invention will become more apparent from the following detailed description of a preferred embodiment thereof taken in conjunction with the accompanying drawings, wherein.

DESCRIPTION OF THE PREFERRED EMBODIMENT

Figure 1:
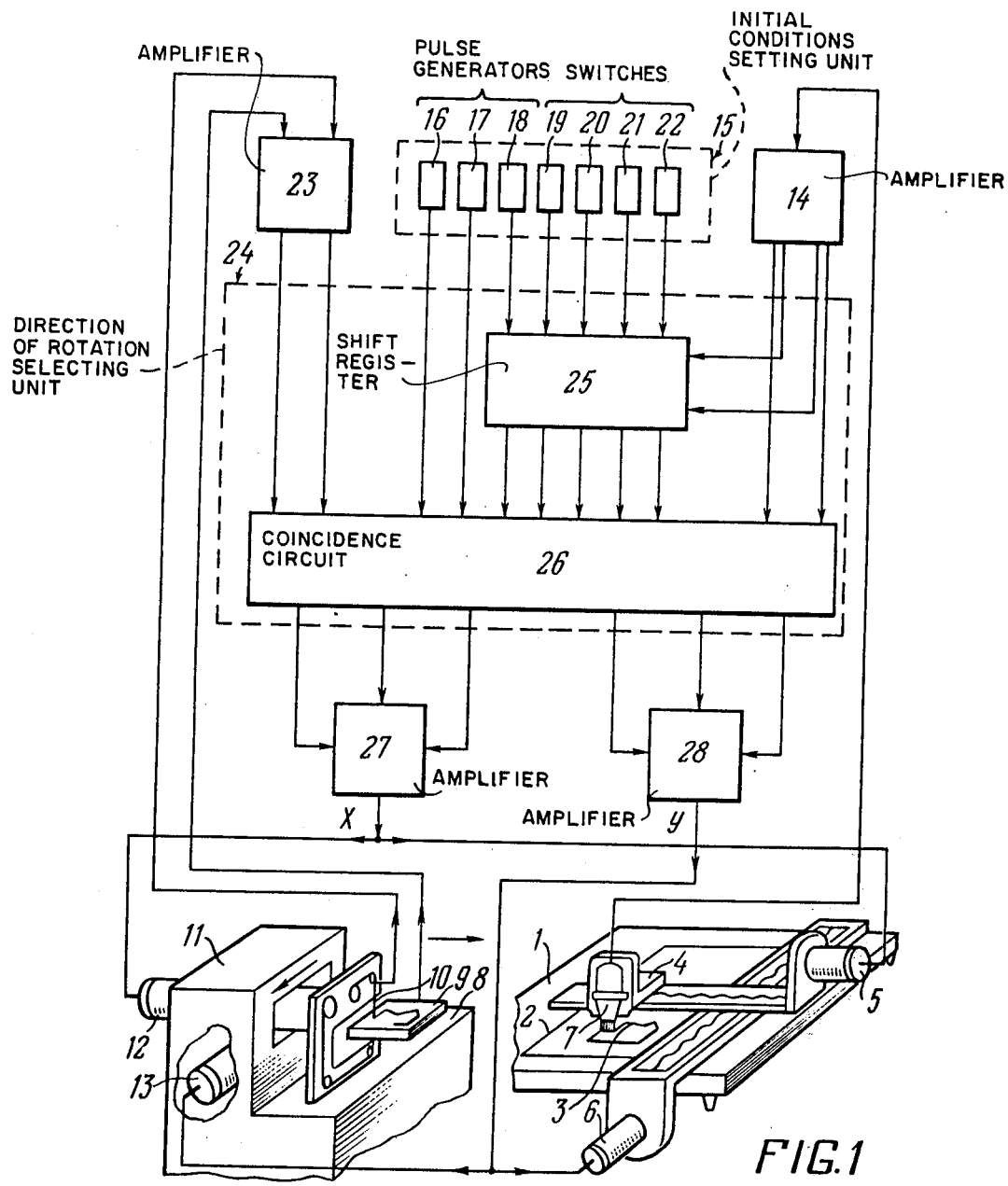
FIG. 1 is a schematic block diagram of a device for automatically controlling an electroerosion cutting machine, in accordance with the invention.

Referring now to the accompanying drawings, the proposed device for automatically controlling an electroerosion cutting machine contains a coordinate follow table 1 (FIG. 1) whereupon there is placed a drawing 2. A line 3 in drawing 2 represents the contour of a piece to be worked.

Mounted on the coordinate follow table 1 is a carriage 4 driven in two coordinates by drive motors 5 and 6 which are conventional step motors.

Mounted on the carriage 4 is an optical head 7.

On the other side, the machine has a table 8 rigidly secured to the machine's bed. Attached to the table 8 is a workpiece 9. Moving in relation to workpiece 9 is an erosion tool 10 which in the present case is a thin wire.

The tool 10 is mounted on a slide rest 11 of the machine, which is mechanically coupled to drive motors 12 and 13. Motors 12 and 13 are also step motors and move the rest 11 and tool 10 in two coordinates.

The electrical output of the optical head 7 is connected to the input of an amplifier 14 which is a conventional d.c. amplifier with four divided outputs.

The presence of the four divided outputs is due to the fact that in the amplifier 14 there are four threshold circuits. At the output of each of these threshold circuits there appears a signal in the presence of a certain signal level at its input. Each of the circuits responds by an output signal only to a specific input signal level.

A unit 15 for setting initial conditions of electroerosion working contains three pulse generators 16, 17 and 18, each constructed as a conventional multivibrator, wherein it is possible to vary the repetition frequency of output pulses.

The generator 16 sends a signal to those two of the step motors 5, 6, 12 and 13 which move the carriage 4 with the optical head 7 and the tool 10 in one coordinate; the generator 17 sends a signal to those two of the motors 5, 6, 12 and 13 which move said carriage 4 and tool 10 in the other coordinate.

The unit 15 for setting initial conditions of electroerosion working further includes four switches 19, 20, 21 and 22 which set an initial combination of directions of rotation of the step motors 5, 6, 12 and 13.

An amplifier 23 also contains a conventional threshold circuit. At two outputs of this circuit there appear, in different combinations, signals at different signal levels at its input which are connected to the erosion gap (the space between the workpiece 9 and the electroerosion tool 10).

A unit 24 for selecting a direction of rotation of the drive motors in the course of electroerosion working has a reversible ring shift register 25 which has a conventional circuitry and includes four conventional flip-flops, four delay lines, and four switches.

The flip-flops are memory elements for storing combinations of rotation of the motors 5, 6, 12 and 13. The delay lines are intended to distribute over time the read and write moments in the memory elements. The switches are meant to reverse the register 25, i.e. they determine the shift direction of register 25.

Connected to the inputs of the shift register 25 are the outputs of the switches 19, 20, 21 and 22 of the unit 15 for setting initial working conditions, and the output of the pulse generator 18 whose signal determines the shift speed of the register 25. Connected to the reversible inputs of register 25 are two respective outputs of the amplifier 14.

The unit 24 for selecting directions of rotation of the drive motors in the course of electroerosion working further has a coincidence circuit 26 containing conventional AND and OR gates and which automatically selects the directions of rotation.

Connected to the inputs of the coincidence circuit 26 are the two other outputs of the amplifier 14, four outputs of the reversible ring shift register 25, two outputs of the amplifier 23, and outputs of the pulse generators 16 and 17.

The coincidence circuit 26 has six outputs, three of which are connected to inputs of an amplifier 27; the remaining three are connected to inputs of an amplifier 28.

Each of the amplifiers 27 and 28 contains a conventional switching circuit for changing the direction of rotation of a motor depending upon which input a signal is applied.

Each of the amplifiers 27 and 28 have three inputs, one of which is intended for a signal that determines the rotation speed of a respective motor; the other two are intended for a signal of the direction of rotation.

The output of the amplifier 27 is electrically connected to windings of the step motors 12 and 5; the output of the amplifier 28 is connected to windings of the step motors 13 and 6.

The coincidence circuit 26 (FIG. 2) comprises twenty-four AND circuits 29 through 52, and six OR circuits 53 through 58.

The first inputs of the AND circuits 29 through 32 of the first group are connected to the first output of the amplifier 23, to whose second input there are connected the first inputs of the AND circuits 33 through 36.

The first inputs of the AND circuits 37 through 40 are connected to the second output of the amplifier 14, at which there appears a signal in the presence of an input signal of a second level.

The first inputs of the AND circuits 41 through 44 are connected to the third output of the amplifier 14, at which there appears a signal in the presence of an input signal of a third level.

The first inputs of the AND circuits 45 through 48 are connected to the output of the generator 16 of the unit 15 for setting initial working conditions. The first inputs of the AND circuits 49 through 52 are connected to the output of the generator 17 of the unit 15.

The second inputs of the AND circuits 29, 33, 37, 41, 45 and 49 are connected to the first output of the shift register 25. The second inputs of the AND circuits 30, 34, 38, 42, 46 and 50 are connected to the second output of the shift register 25. The second inputs of the AND circuits 31, 35, 39, 43, 47 and 51 are connected to the third output of the register 25. Finally, the second inputs of the AND circuits 32, 36, 40, 44, 48 and 52 are connected to the fourth output of the shift register 25.

The outputs of the AND circuits 29, 35, 40 and 42 are connected to the inputs of the OR circuit 53. Connected to the inputs of the OR circuit 54 are the outputs of the AND circuits 30, 36, 37 and 43. Connected to the inputs of the OR circuit 55 are the outputs of the AND circuits 31, 33, 38 and 44.

The outputs of the AND circuits 32, 34, 39 and 41 are connected to the inputs of the OR circuit 56. Connected to the inputs of the OR circuit 57 are the outputs of the AND circuits 45, 47, 50 and 52. Connected to the inputs of the OR circuit 58 are the outputs of the AND circuits 46, 48, 45 and 51.

The outputs of the OR circuits 53 and 55 are connected to the inputs of the amplifier 28. The outputs of the OR circuits 54 and 56 are connected to the inputs of the amplifier 27, which determine the direction of rotation of the motors.

Connected to the third inputs of the amplifiers 28 and 27 are the outputs of the OR circuits 57 and 58, respectively.

Figure 3:
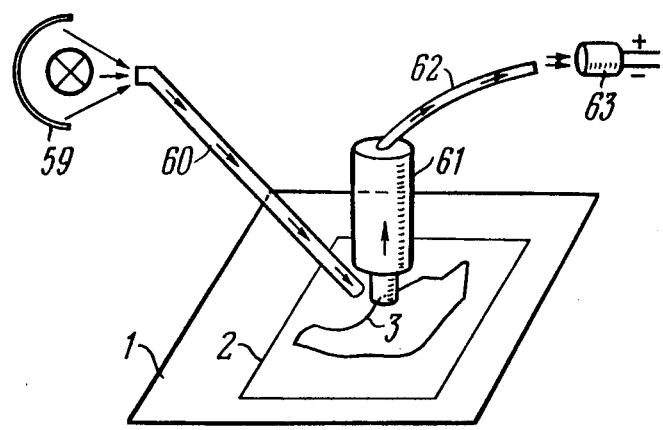
FIG. 3 is a schematic representation of an optical head in accordance with the invention.

The proposed device for automatically controlling an electroerosion cutting machine employs the non-pivotable optical head 7 shown in FIG. 3.

The optical head includes two sections, a lighting section and a projection section.

The lighting section includes a light source 59 and a light guide 60. The projection section includes a projection head 61 from whose outlet there is arranged a receiving light guide 62. Arranged at the opposite end of the latter is a photoreceiver 63 whose function may be performed by a photodiode connected to the input of the amplifier 14 (FIG. 1).

Figure 4:
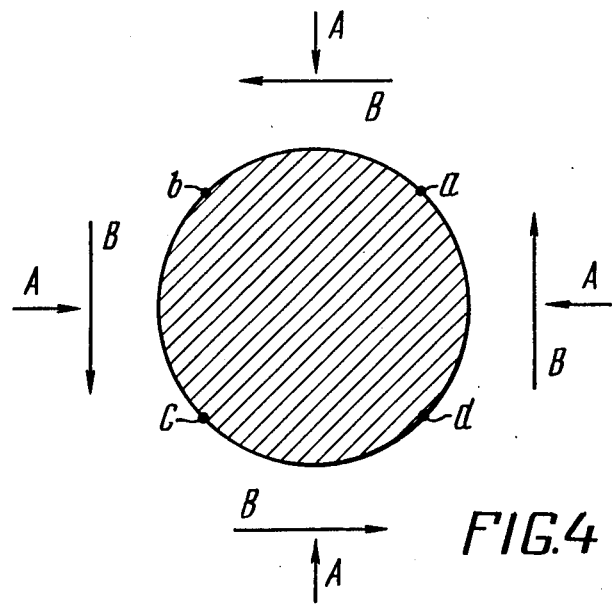
FIG. 4 is a conventional representation of four combinations of directions and rotation speeds of the drive motors in following different portions of a circle-shaped contour, in accordance with the invention.

In FIG. 4, the vectors A and B conventionally show four combinations of directions and speeds of rotation of the motors while following different portions of a circle-shaped contour.

The proposed device for automatically controlling an electroerosion cutting machine operates as follows.

The magnified drawing 2 of a workpiece is placed on the coordinate follow table 1 (FIG. 1).

As the erosion machine and the device for controlling it are brought into operation, interelectrode gap voltage is applied to the spacing between the electrode 10 of the machine and the workpiece 9. The light source 59 (FIG. 3) of the optical head 7 (FIG. 1) then comes on.

Figure 2:
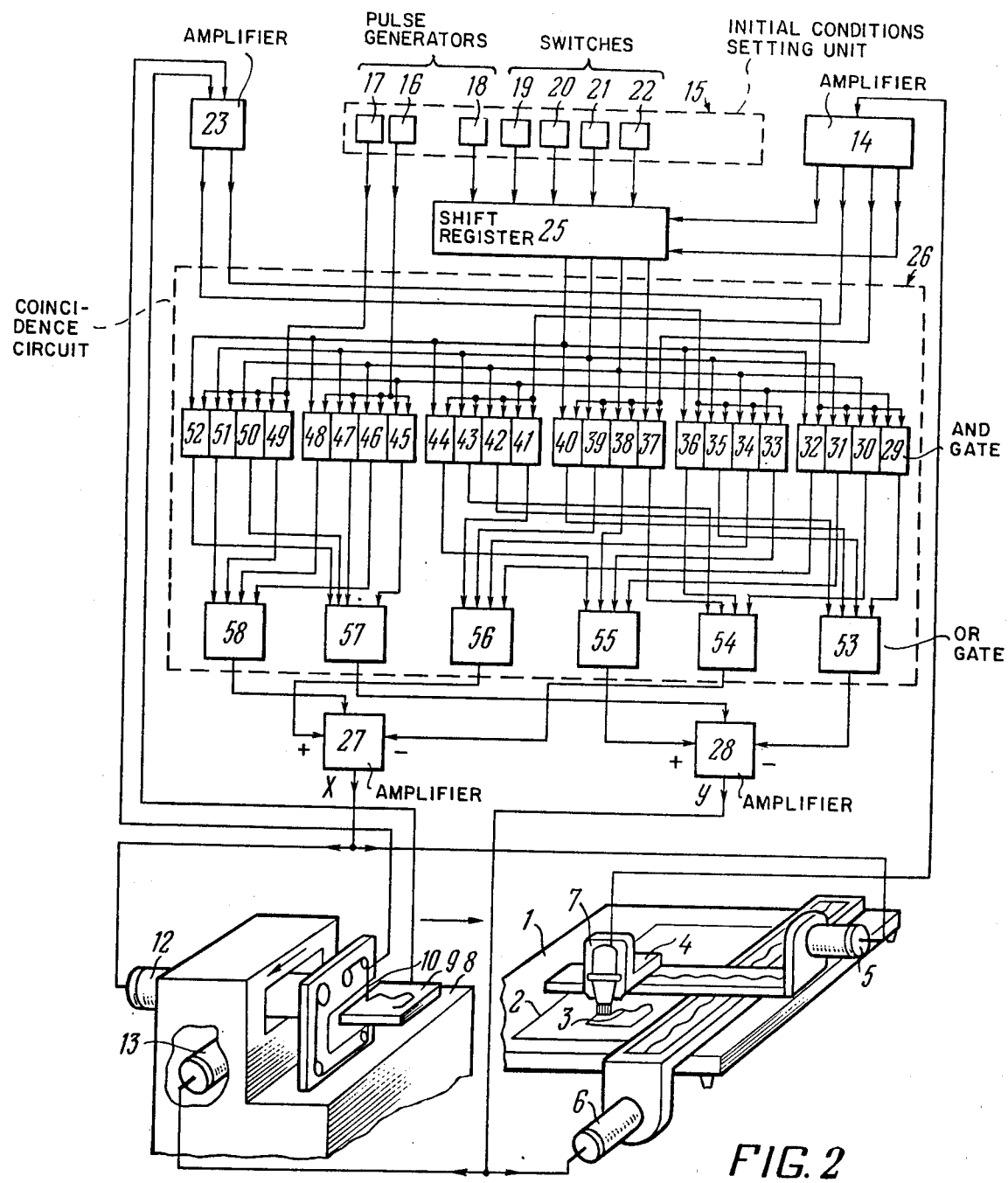
FIG. 2 shows the same, including a functional diagram of the unit for selcting a direction of rotation of drive motors, in accordance with the invention.

Depending upon the magnitude of the interelectrode gap voltage, there is initiated a zero or unity signal at the outputs of the amplifier 23, which signals are applied to the inputs of the AND circuits 29 through 36 (FIG. 2).

In the idling conditions, there appears a unity signal at the first output, and a zero signal at the second output. In the short-circuit conditions, this state in reversed. Under the operating conditions, both outputs are zero.

Simultaneously, there is applied a signal from the output of the photoreceiver 63 (FIG. 3) of the optical head 7 (FIG. 1) to the input of the amplifier 14. The level of this signal determines the output signals of the amplifier 14.

If the optical head 7 is against an extremely light background, there appears a unity signal at the first two outputs of the amplifier 14 and, accordingly, at the first inputs of the AND circuits 37 through 40 (FIG. 2).

If the optical head 7 is on the margin of the line 3 in the drawing, all the outputs of the amplifier 14 are in the zero state. When the optical head 7 is on the line 3 of the drawing there appears a unity signal at the third and fourth outputs of the amplifier 14 and, consequently, at the first inputs of the AND circuits 41 through 44.

In order to follow any closed line, the minimum requirement is the presence of four combinations of directions of rotation of the motors 5, 6, 12 and 13 (combinations of motor traverses).

Prior to the start of working the piece 9, the operator selects, on the basis of technological requirements, one of the four possible combinations of the directions of the motor traverses and the feed rate for each coordinate.

The feed rate for each coordinate is set by the pulse repetition frequency of the generators 16 and 17 and is not changed in the course of working one piece.

Let it be assumed that the first portion to be worked of the workpiece 9 is the arc da (FIG. 4) of the line 3 of the drawing (FIG. 2).

In this case, the operator switches on the first switch 19 of the unit 15 for setting initial working conditions, and the first combination of feed directions in the coordinates is recorded in the first flip-flop of the reversible ring shift register 25.

In addition, applied to the register 25 is a pulse signal from the pulse generator 18, which determines the shift speed of the register 25.

Applied to the first inputs of the AND circuits 45 through 48 is a pulse signal from the pulse generator 16. Applied simultaneously to the first inputs of the AND circuits 49 through 52 is a pulse signal from the output of the generator 17.

As the first combination of feed directions is recorded in the first flip-flop of the register 25, at the first output of the latter there appears a signal which is applied to the second inputs of the AND circuits 29, 33, 37, 41, 45 and 49.

If the interelectrode gap voltage is in excess of the permissible operating voltage, idling conditions are brought about, and there is applied a signal from the first output of the amplifier 23 to the first inputs of the AND circuits 29 through 32.

If at this moment the optical head 7 is against a light portion of the drawing 2, there appears a signal at the second output of the amplifier 14, which signal is then applied to the first inputs of the AND circuits 37 through 40.

Having passed through the conducting AND gates 45 and 49, the pulse signal is then applied via the OR circuits 57 and 58 to the first inputs of the amplifiers 28 and 27 and determines the rotation speeds of the motors 6, 13 and 5, 12.

From the output of the conducting AND circuit 29, the potential signal is applied to the input of the OR circuit 53. From the output of the conducting AND circuit 37, the potential signal is applied to the input of the OR circuit 54.

Having passed through the OR circuit 53, the signal is applied to the input of the amplifier 28. This corresponds to the direction of rotation of the motors 6 and 13 for feed in the $-x$ direction.

Simultaneously, the signal from the output of the OR circuit 54 is applied to the input of the amplifier 27. This corresponds to the direction of rotation of the motors 5 and 12 for feed in the $+y$ direction.

As this takes place, the optical head 7 is moved by the motors 5 and 6 relative to the drawing 2 along the $-x$ and $+y$ coordinates. Accordingly, the tool 10 does the cutting along these coordinates.

As soon as the optical head 7, which moves along the coordinate $+y$, reaches the margin of the line 3 of the drawing 2, i.e. as soon as the photosensor 63 (FIG. 3) registers a half light - half dark area, there will be no signal at all the outputs of the amplifier 14 (FIG. 2); hence, no signal at the first input of the AND circuit 37.

The amplifier 27 is switched off, as no signal is applied to its input from the output of the OR circuit 54. As a result, the feed along the $+y$ coordinate is stopped.

As soon as the feed along the $-x$ coordinate again results in a minor deviation from the line in the drawing, the optical head 7 is again found against a light background, so there appears a signal at the second output of the amplifier 14, which signal switches on, via the AND circuit 37 and the OR circuit 54, the motors 5 and 12 and thus ensures a feed along the $+y$ coordinate until the situation is brought back to normal, i.e. until the half light-half dark state is reached.

If the interelectrode gap voltage is less than the permissible operating voltage, the short-circuit conditions are brought about, and there is applied a signal from the second output of the amplifier 23 to the first inputs of the AND circuits 33 through 36.

The AND circuit 33 is driven into conduction, and the signal is applied via the OR circuit 55 to the other input of the amplifier 28 and initiates reverse feed of the motors 6 and 13. Thus, movement along the $+y$ coordinate is continued until the optical head 7 reaches the dark background of the line 3 in the drawing 2. At this moment, there appears a signal at the third output of the amplifier 14, while the signal disappears at its second output.

Via the conducting AND circuit 41 and the OR circuit 56, this signal is applied to the second input of the amplifier 27. The feed of the motors 5 and 12 is reversed, and there starts movement along the $+x$ coordinate.

This continues until the optical head leaves the dark background and is found on the margin of the line 3 of the drawing 2, i.e. until there is no signal at the outputs of the amplifier 14.

As soon as the interelectrode gap voltages reach the permissible operating level, the initial working conditions are restored.

At the points of bends in the contour of the drawing 2, there must be a different relationship between the directions and rates of feeds, as at these points one of the feeds lags behind the other.

For example, at points a, b, c and d (FIG. 4) of a circle-shaped contour, the relationship between the directions and rates of the feeds must vary.

Having arrived at the point after the arc da, the optical head 7 (FIG. 1) will be found far from the line 3, against a light background, if the relationship between the feed directions and rates remains unchanged.

As soon as there is a signal applied with a level corresponding to the light background to the input of the amplifier 14, at the two first outputs of the amplifier 14 there is produced a signal which is then applied to the first reversible input of the register 25 and determines the shift direction of register 25.

Under the action of this signal, there occurs a shift from the first to the second flip-flop of the register 25 of the original combination of feed directions recorded in the first flip-flop.

This shift takes place under the action of clock pulses applied to the register 25 from the output of the pulse generator 18, provided there is a signal at one of the reversible inputs of register 25.

Following this shift, there is no longer a signal at the first output of the register 25, but there appears a signal at the second output of the register 25.

This signal is then applied to the first inputs of the AND circuits 30, 34, 38, 42, 46 and 50 (FIG. 2). Applied to the second input of the AND circuit 38 is also a signal from the second output of the amplifier 14. As a result, at the output of the AND circuit 38 there appears a signal which is applied via the OR circuit 55 to the input of the amplifier 28.

Suppose the device operates under short-circuit conditions i.e. to the first inputs of the AND circuits 33 through 36 there is applied a signal from the second output of the amplifier 23.

With the original combination of feeds, in this case there was movement along the $+y$ coordinate at a speed corresponding to the pulse repetition frequency of the generator 16, as well as movement along the $-x$ coordinate at a speed corresponding to the pulse repetition frequency of the generator 17.

With a new combination of feeds, a signal which is applied to the input of the amplifier 28 from the output of the OR circuit 55 ensures movement in the same direction along the $+y$ coordinate, but at a different speed, because there is applied at the same time to the other input of the amplifier 28, via the conducting AND circuit 50 and the OR circuit 57, a frequency signal from the output of the generator 17.

Simultaneously, from the output of the conducting AND circuit there is applied a signal via the OR circuit 56 to the input of the amplifier 27. This signal ensures movement in the opposite direction along the $+x$ coordinate, but at a different speed, because via the conducting AND circuit 46 and the OR circuit 58 there is applied a signal to the other input of the amplifier 27 from the output of the generator 16.

If, however, the bend is so sharp that the new combination of feeds cannot bring the optical head 7 to the margin of the line 3 of the drawing 2, with the arrival of the following clock pulse from the output of the generator 18, there occurs one more shift in the register 25 in the same direction, whereby there is automatically brought about a new combination of directions and rates of feeds in both coordinates.

Two such changes in the directions and rates of feeds are enough to ensure the following of a contour of any degree of curvature.

If the optical head 7 is found against an extremely dark background of the line 3 in the drawing 2, there appears a signal at the third and fourth outputs of the amplifier 14. This signal is applied to the other reversible input of the register 25 and brings about a shift of the register 25 in the direction opposite to the one described above, which results in an automatic change in the combination of directions and rates of feeds, whereby the optical head 7 is again brought to the margin of the line 3 of the drawing 2.

The proposed device for automatically controlling an electroerosion cutting machine possesses such important advantages as a high operation speed and high accuracy of following the line 3 of the drawing 2 at points of sharp bends of the contour. These advantages are due to the use of the unit 24 for selecting directions of rotation of the drive motors in the course of erosion working, as well as the non-pivotable optical head 7 with its quick response and simple design.

The absence of any auxiliary mechanical means for synchronizing the movement of the optical head 7 and the erosion tool (the wire 10) makes it possible to employ the proposed device in combination with any type of electroerosion machine with step drive motors.

In addition, the device of the present invention may be used with any cutting machine provided with mills, as well as laser and etching tools.

What is claimed is:

1. A device for automatically controlling an electroerosion cutting machine, comprising: a coordinate follow table with a drawing placed thereon; an optical reading head; coordinate drive motors which move coordinate-wise said optical reading head relative to said drawing and an electroerosion tool relative to a workpiece; a first amplifier having an input connected to the output of said optical reading head, and four outputs; a second amplifier having an input connected to the erosion gap, and two outputs; a unit for setting initial conditions of electroerosion working having outputs; a unit for selecting directions of rotation of said drive motors in the course of said electroerosion working and having inputs and outputs; a reversible ring shift register of said unit for selecting directions of rotation of said drive motors and having inputs and outputs, inputs of said reversible ring shift register being connected to outputs of said unit for setting initial conditions of electroerosion working intended for a signal of initial rotation directions, said outputs of the unit for setting initial conditions of electroerosion working being intended for a signal of shift speed of said reversible ring shift register, and said first and second outputs of said first amplifier being intended for signals for reversing the shift direction of said register; a coincidence circuit in said unit for selecting directions of rotation of said drive motors and having inputs and outputs, inputs of said coincidence circuit being connected to said third and fourth outputs of said first amplifier, said outputs of said reversible ring shift register, said outputs of said second amplifier, and outputs of the unit for setting initial conditions of electroerosion working being intended for a signal of preset rotation speeds of said drive motors; a third amplifier having three inputs connected to the said three first outputs of said coincidence circuit, and two outputs connected to said drive motors for moving said optical head relative to said coordinate table and said electroerosion tool relative to said workpiece along the first coordinate; a fourth amplifier having three inputs connected to said three other outputs of said coincidence circuit, and two outputs connected to said drive motors for moving said optical head relative to said coordinate table and said electroerosion tool relative to said workpiece along the second coordinate.

2. A device as claimed in claim 1, wherein said coincidence circuit has three groups, each composed of four AND circuits and six OR circuits, first inputs of said AND circuits of the first group being connected to said first output of said second amplifier having said second output connected to the first inputs of said AND circuits of the second group, first inputs of said AND circuits of the third group being connected to said third output of said first amplifier having said fourth output connected to the first inputs of said AND circuits of the fourth group, the first inputs of said AND circuits of the fifth and sixth groups being connected respectively to said two outputs of said unit for setting initial conditions of electroerosion working and intended for a signal corresponding to preset rotation speeds of said drive motors, the second inputs of said first, second, third and fourth AND circuits of all the groups being connected respectively to said first, second, third and fourth outputs of said reversible ring shift register, the outputs of said first, third, fourth and second AND circuits respectively of the first, second, third and fourth groups being connected to the input of said first OR circuit with output connected to said first direction input of said third amplifier, the outputs of said second, fourth, first and third AND circuits respectively of the first, second, third and fourth groups being connected to the inputs of said second OR circuit with output connected to said first direction input of said fourth amplifier, the outputs of said third, first, fourth and second AND circuits respectively of the first, second, fourth and second groups being connected to the inputs of said third OR circuit with output connected to said second direction input of said third amplifier, the outputs of said fourth, second, third and first AND circuits respectively of the first, second third and fourth groups being connected to the inputs of said fourth OR circuit with output connected to said second direction input of said fourth amplifier, the outputs of said first and third AND circuits of the fifth group and said second and fourth AND circuits of the sixth group being connected to the inputs of said fifth OR circuit, the outpus of said second and fourth AND circuits of the fifth group and said first and third AND circuits of the sixth group being connected to the inputs of said sixth OR circuit, the outputs of said fifth and sixth OR circuits being connected to said third inputs of said third and fourth amplifiers, respectively.

* * * * *